United States Patent [11] 3,630,536

[72] Inventor Hans Scharfen
Buederich, Germany
[21] Appl. No. 23,593
[22] Filed Mar. 30, 1970
[45] Patented Dec. 28, 1971
[73] Assignee Paul Forkardt Kommanditgesellschaft
Duesseldorf, Germany
[32] Priority Mar. 29, 1969
[33] Germany
[31] P 19 16 275.5

[54] ROTATABLE CHUCK, ESPECIALLY FOR TURNING MACHINES
11 Claims, 15 Drawing Figs.
[52] U.S. Cl. .................................................. 279/5,
33/174 TD, 33/180 R, 408/71
[51] Int. Cl. ........................................................ B23b 31/36
[50] Field of Search .......................................... 279/1 R, 5;
269/55, 63; 408/71; 33/180 R, 174 TD, 174 TB

[56] References Cited
UNITED STATES PATENTS
2,621,937 12/1952 Hunziker ...................... 279/5
2,646,152 7/1953 Retz .............................. 279/5 X
2,930,626 3/1960 Sharp ........................... 279/5
2,998,257 8/1961 Wallingford .................. 279/5

*Primary Examiner*—Andrew R. Juhasz
*Assistant Examiner*—James F. Coan
*Attorney*—Walter Becker ABSTRACT: The specification discloses a chuck rotatable on a work axis and having workpiece-engaging jaws rotatable on an axis extending perpendicular to the work axis. A disc is connected to rotate with the jaws and protrudes from the side of the chuck body and has elements in the form of grooves or cams thereon facing away from the chuck body. These elements occupy respective axial planes of the chuck body in respective rotated positions of the disc and are adapted for cooperation with feeler members of a control device. A feeler member is located in each said axial plane and is movable from a retracted position away from the chuck body to an advanced position wherein one end is in the path of movement of a respective element of said disc in the respective rotated position of the disc.

The present invention concerns a rotating chuck which is intended particularly for turning machines and is designed as displaceable or rotatable chuck with clamping jaws which are adapted to be controlled during the rotation of the chuck so as to be displaced transverse to the axis of the chuck body and/or to be pivoted about an axis different from the axis of rotation of the chuck.

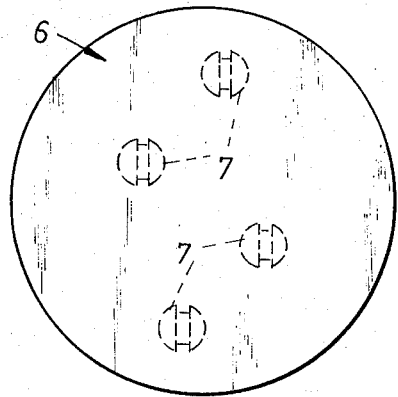
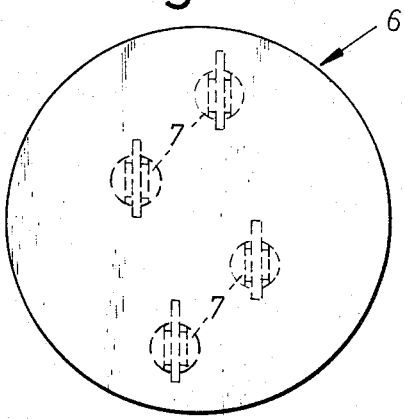
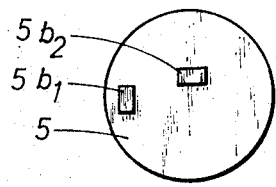
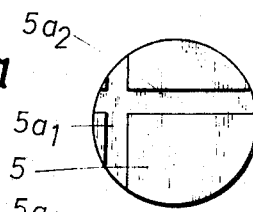
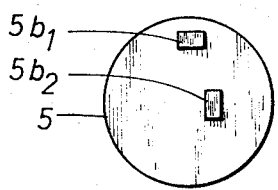
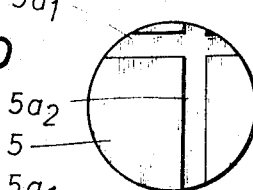
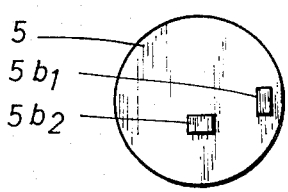
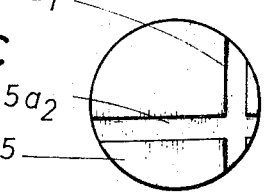
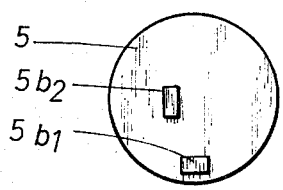
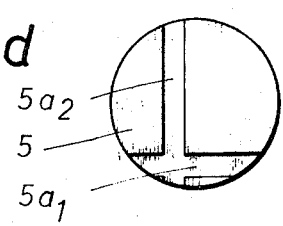

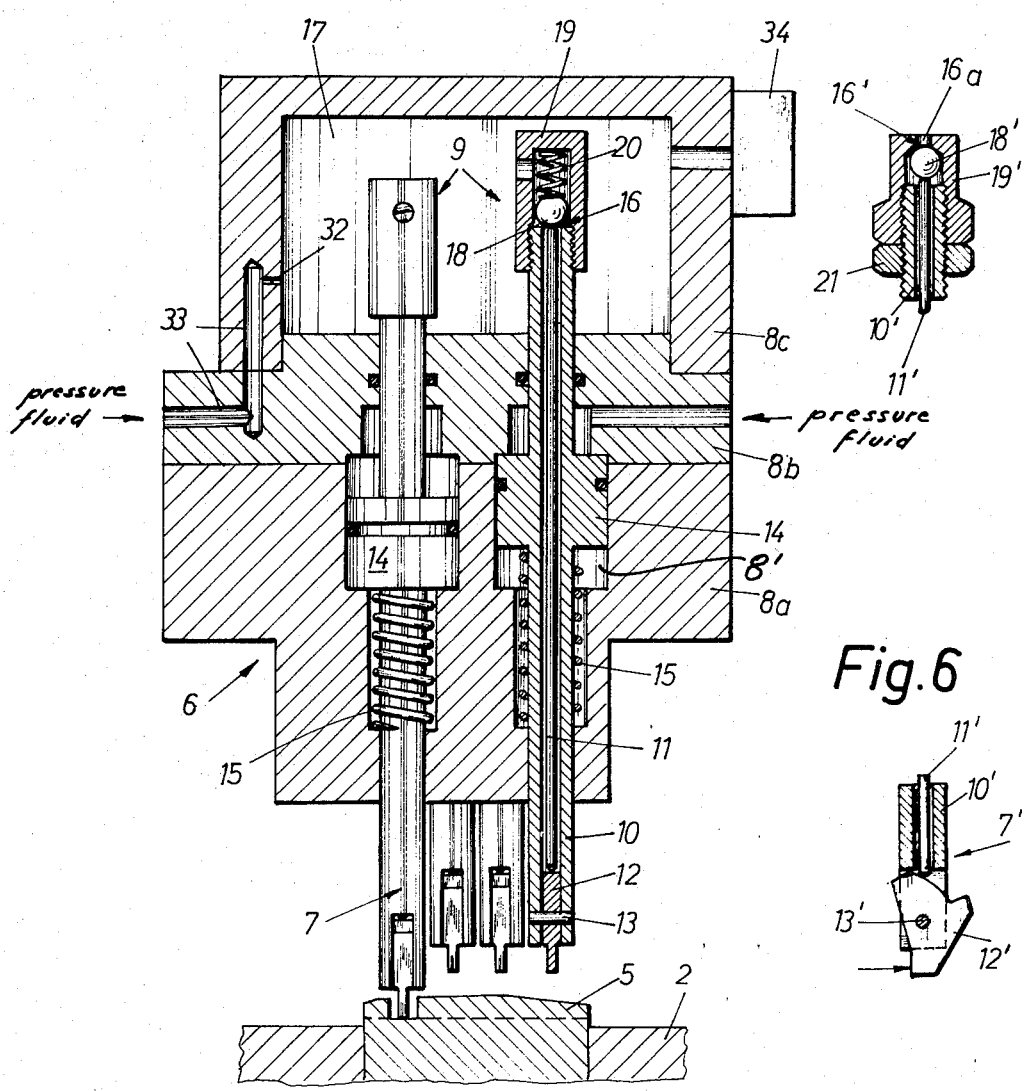

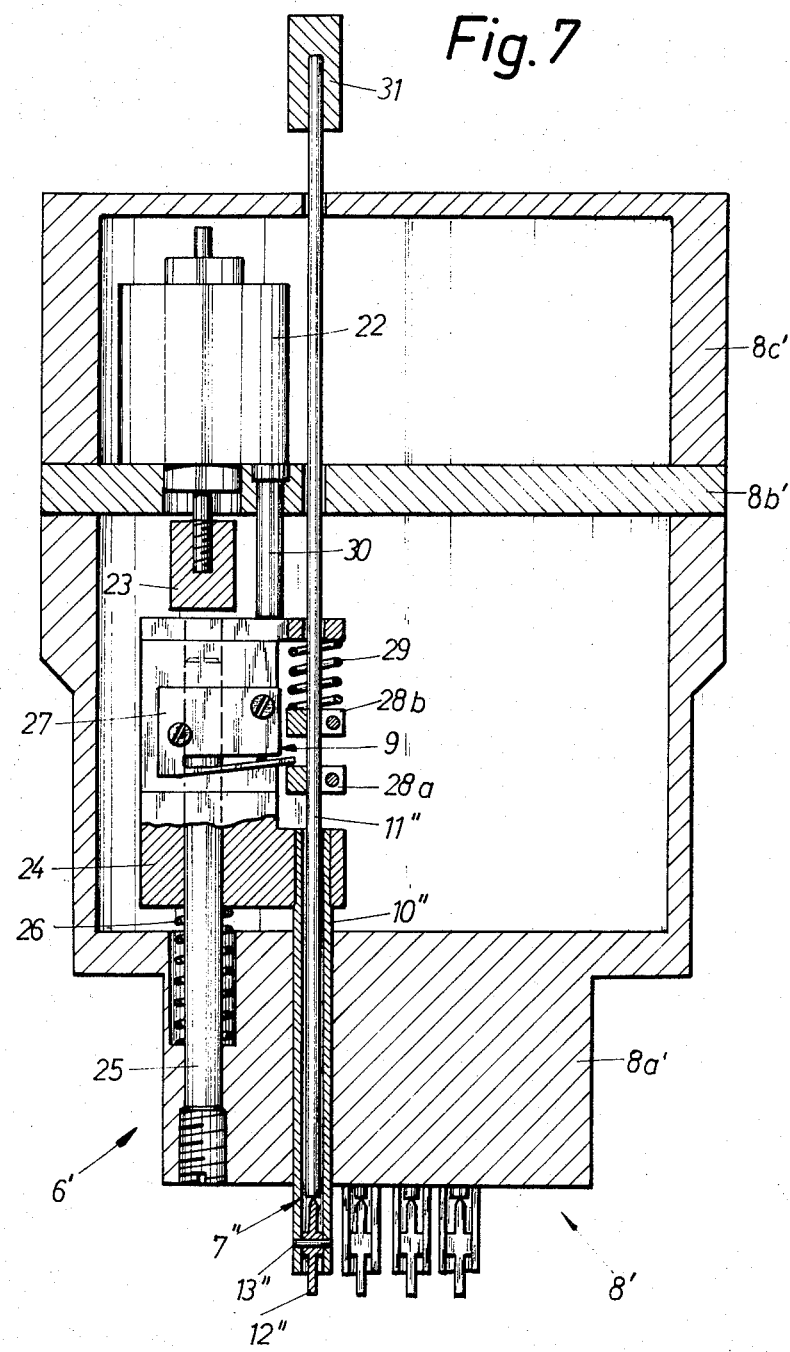

ROTATABLE CHUCK, ESPECIALLY FOR TURNING MACHINES

Rotating chucks are known in which the clamped-in workpiece will during the entire machining operation successively move into a plurality of working positions. In a displaceable chuck, the workpiece with the clamping jaws is moved back and forth between two or more working positions in a direction transverse to the axis of rotation, for instance, in order to machine a plurality of parallel bores. In the so-called pivotal chuck, the workpiece is with the clamping jaws pivoted stepwise about a pivot axis which is different from the axis of rotation of the chuck in order to be able to machine the rotatable surface with different axes crossing each other. Such pivotable chuck with automatic control during the rotation of the spindle is disclosed, for instance, in German Pat. No. 1,092,276. Chucks of this type are frequently employed in turning machines in which also the working cycle of the tools is controlled automatically. In order to save a continuous checking operation by an operator while nevertheless being able to prevent a breakage of the tools or a damage to the workpiece, there exists the requirement so to time the movements of the workpiece and the tools with regard to each other that no tool can be used as long as it is not in its corresponding operative position. With workpieces which in each machining axis are to be given the same shape and dimensions as is the case, for instance, with journal cross assemblies, it will suffice to correctly and completely carry out the advance of the workpiece. With nonsymmetric workpieces, for instance, valve housings which for each working operation of the workpiece require different machining tools, or another movement of a copying tool, it is necessary to assure that in each working position those tools are employed which are intended for the respective operation, and that these tools carry out the proper feeding movement.

To this end, it has become known to indicate the position of the rotatable clamping jaws of the chuck by a signal disc which protrudes from the mantle surface of the chuck body, and to scan or feel the disc by means of a stationarily arranged control device. With heretofore known arrangements of this type, the control device comprises three light barriers which cooperate with three substantially equal cams which are arranged radially on the signal disc so that each position of the pivotal jaws is characterized by another combination of the interrupted light barriers.

One of the difficulties of designs of the above-mentioned type consists in that the light barrier assembly is located in the working space and thus is exposed to chips and the cooling water. For this reason it was necessary to mount the emitter and receiver of the unit in sealed chambers which required relatively many parts and expenses. In spite of these expenses, it was impossible to assure the safety of operation for normal working conditions so that the heretofore known design was not adopted in practice to any material extent.

It is, therefore, an object of the present invention to provide a control device for the position of the clamping jaws of a rotating chuck which in spite of a simple construction will assure a safe functioning also during normal operation and which without high expenses can also be installed in already existing turning machines with pivotable chucks.

These and other objects and advantages of the invention will appear more clearly from the following specification in connection with the accompanying drawings, in which:

FIG. 1 is a front view of a pivotable chuck while showing in side view a control device associated therewith.

FIG. 2 together with FIGS. 2a–2d diagrammatically and respectively illustrate a rear view of the control device and four different positions of a signal disc provided with grooves.

FIG. 3 together with FIGS. 3a–3d diagrammatically and respectively illustrate a rear view of the control device and four different positions of a signal disc provided with cams.

FIG. 4 is a longitudinal section through a first embodiment of a control device according to the invention which corresponds to the device of FIG. 1.

FIG. 5 is a longitudinal section through a modified valve for use as signal emitter.

FIG. 6 represents an arrangement of a pivotable lever for use in connection with the modified valve arrangement of FIG. 5.

FIG. 7 is a longitudinal section through a second embodiment of a control device according to the invention.

Figure 1:
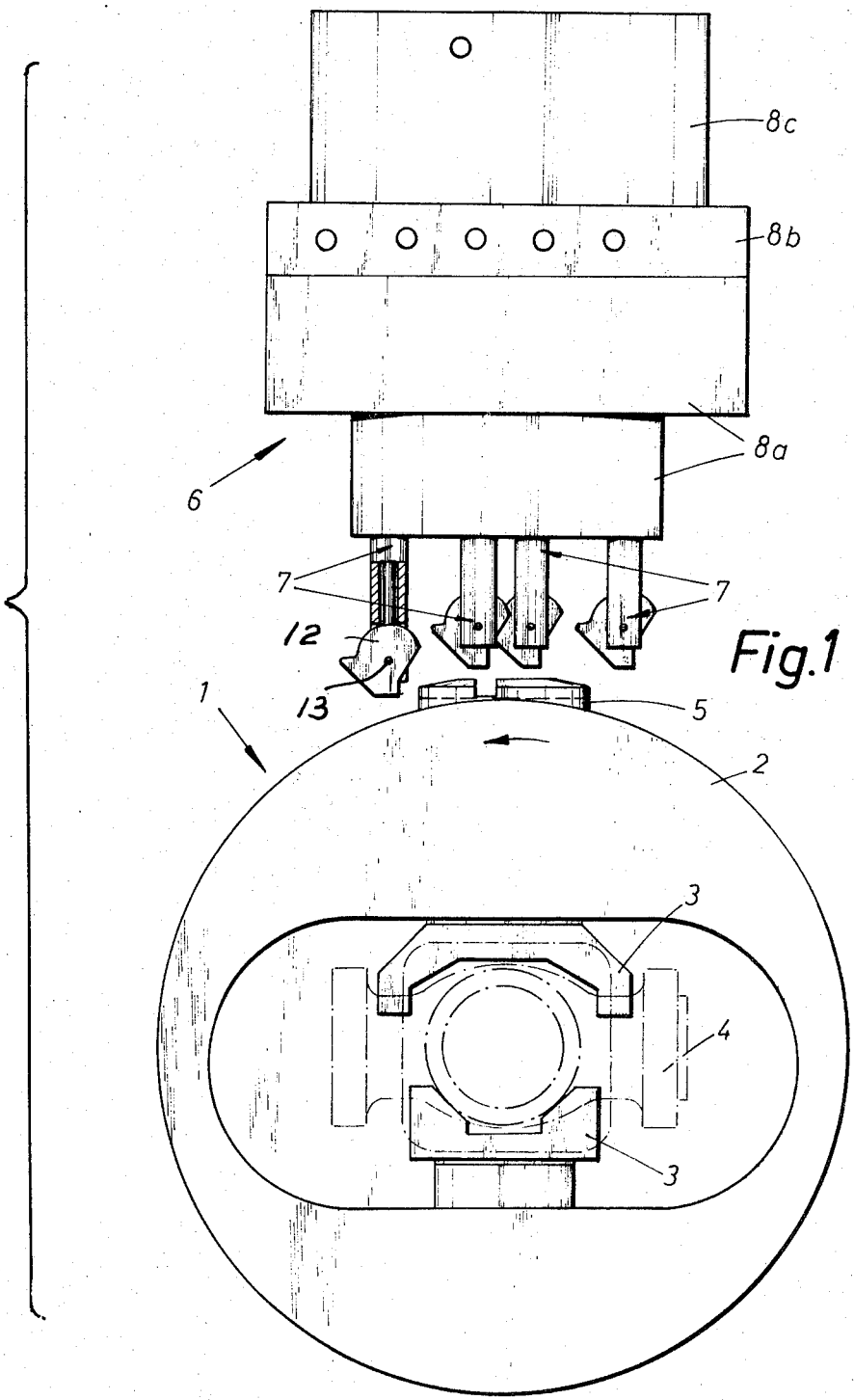

The chuck according to the present invention is characterized primarily in that the signal disc is provided with a number of grooves or cams respectively indicating the possible control positions, and is furthermore characterized in that the control device comprises a number of feeler rods corresponding in number to the possible control positions, which feeler rods are adapted to extend or to be advanced into the rotary path of the grooves or cams in or on the signal disc.

When parallelly displacing the jaws and the workpiece in a direction transverse to the axis of rotation and with the control positions of the pivotable chuck displaced relative to each other by 180°, one groove or cam at a time will suffice to indicate the respective position. With a pivotable chuck, the grooves or cams do not extend through the control axis thereof so that in the two different control positions spaced from each other by 180°, they will occupy two different positions. For chucks with an angular change of the jaws and the workpiece by more or less than 180°, one groove or cam each is provided for each position so that in each position of the jaws one cam or jaw will extend in circumferential direction. The necessary ability to distinguish will in such instance be assured by the fact that the individual grooves or cams are arranged at different distances from the axis of rotation.

According to one embodiment of the invention, each feeler rod comprises a hollow bar which is displaceable in the housing of the control device radially with regard to the axis of rotation of the chuck body and also comprises a control rod guided in the hollow bar. This control rod is adapted to be actuated by a pivotable lever which cooperates with the signal disc and is located at the front end of the hollow bar, said control rod having that end thereof which is located within the housing of the control device and protrudes from the hollow bar connected to a signal emitter.

According to a preferred embodiment of the invention, each hollow bar is connected to a pressure medium operable piston the stroke of which in the pertaining cylinder corresponds to the displacement for the scanning movement of the pivotable lever or rocker, said piston being adapted either to be acted upon by a pressure medium on both sides or being adapted to be advanced against the thrust of a return spring.

The signal emitter of each feeler rod may, in conformity with the invention, be designed as a valve which is arranged within a pressure chamber connected to a pressure monitor for emitting electric impulses so that the pressure variations produced by the valve can be converted into electric impulses. According to one embodiment of the invention, the valve is formed by a ball cooperating with a control rod, said ball being displaceable within a valve housing placed upon the end of the hollow bar for freeing an opening at the end of the valve. In this connection the bore of the hollow bar may form a valve opening in which instance the ball is held in its closing position by a valve spring and by the pressure medium. On the other hand it is possible to provide a valve opening at the free end of the valve housing and to load the ball in its closing position by the control rod. Instead of a pressure medium cylinder with piston, also a magnet may be employed for producing the feeding movement of the feeler rod. The stroke of the magnet is adjustable in conformity with the displacement for the scanning movement of the pivotable lever, and the movable parts of the magnet are adapted by means of a pressure spring to return to their starting position. With this arrangement it may, according to a further feature of the invention, be advantageous to employ an electroswitch as signal emitter for each feeler rod.

A control device designed according to the features of the present invention and cooperating with a signal disc according to the invention is simple in construction and relatively inexpensive to manufacture. Moreover, such a device is, as numerous tests over a longer period of time have proved, fully operable under difficult working conditions so that normally the timing of the workpiece position in conformity with the position of the pivotable jaws with the corresponding movement of the tools will always be assured. If the synchronism of the controls for the workpiece and the tools should be disturbed for any reason, the employment of the next tool will be prevented. The sequence in which the tool moves to its different working positions may be fixedly determined in conformity with the construction of the chuck or may be adjustable at random. Similarly, the different tools and tool movements may be employed in a nonvariable sequence or at variable sequence.

For the employment of the device according to the present invention and, more specifically, the control thereof, there exist fundamentally two different possibilities:

a. In the first instance, the feeler pertaining to the respective position of the clamping jaws is not to be actuated so that it merely acts as a monitor, and an impulse is produced by the signal emitter only when the synchronism is disturbed.

b. In the second instance, it is intended at the correct position to actuate the respective signal emitter which may serve either as a monitor or as an impulse emitter for the further course of the control mechanism.

In both instances the course of the control may either be designed in conformity with the position of the workpieces or in conformity with the program sequence of the tools. In this connection, a rigid program sequence may be effected by the employment of a control drum, a cam strip, a punchcard or a punch strip, or a sequence control may be carried out.

Referring now to the drawings in detail, FIG. 1 showing an overall view of the device according to the invention illustrates a pivotable chuck 1 known per se with rotatable clamping jaws 3 which are adapted in the chuck body 2 during the rotation of the chuck to be controlled i.e., in a direction transverse to the direction of rotation of the chuck body and rotatable about an axis other than the axis of rotation of the chuck. According to the illustrated embodiment, the pivot axis of the clamping jaws 3 is perpendicular to the axis of rotation of the chuck body 2. According to the embodiment illustrated in FIG. 1, the clamping jaws 3 which have clamped therein a workpiece 4 indicated by dot-dash lines are adapted to be advanced by 90° so that they are able to occupy a total of four different control positions. In order to indicate the respective position of the clamping jaws 3 and to be able to scan these positions, there is provided a signal disc 5 which protrudes from the mantle surface of the chuck body 2. Disc 5 is fixedly connected to one clamping jaw or the pivotal shaft carrying the same, and in conformity with the illustration in FIGS. 2a-2d is provided with grooves 5a. For purposes of scanning the respective position of the signal disc 5, there is stationarily arranged a control device 6 which is equipped with a number of feeler rods 7 corresponding in number to the number of possible control positions. The structure of the control device 6 will be described further below.

FIG. 2 illustrates a rear view of the control device 6 while the arrangement of the feeler rods 7 at the front side of the control device 6 is indicated by dot-dash lines. The signal disc 5 moves in one of its four possible positions illustrated in FIGS. 2a-2d in the direction indicated by the arrow past the feeler rod 7. In each of the four positions of the signal disc 5 there will be one feeler rod 7 which cooperates with a groove $5a_1$ or $5a_2$ extending in the circumferential direction of the rotating chuck 1 so that when the respective feeler rod 7 is moved into the circumferential region of the signal disc 5, no contact between the feeler rod 7 and the signal disc 5 will take place. In the FIG. 2a position of the signal disc 5, groove $5a_1$ located in circumferential direction prevents the feeler rod 7 which in FIG. 2 occupies the farthest left-hand position from abutting the signal disc 5. According to the FIG. 2b position, groove $5a_2$ prevents an engagement of the feeler rod 7 shown at the top on FIG. 2. Corresponding conditions apply to the FIG. 2c and FIG. 2d positions of the signal disc 5 with regard to the two remaining feeler rods 7.

With the embodiment according to FIGS. 1 and 2 only one feeler rod 7 must be advanced at a time because during the normal operation, no feeler rod 7 should abut. The impulse for the feeding or advancement of a feeler rod 7 is furnished by the control of the machine directly or by the preceding tool. The impulse is always specific for a certain tool or a certain tool movement and brings about the operation of only that feeler rod which corresponds to this specific tool arrangement.

The diagrammatic illustration according to FIGS. 3 and 3a-3d shows an arrangement according to which the feeler rod 7 respectively associated with the respective signal disc position is to be engaged by a cam 5b on the signal disc 5. The cams 5b are so designed that in each position of the signal disc 5 only one cam 5b is located in the plane of a feeler rod 7. Therefore, with this design it is possible to work with feeler rods adapted to be advanced or to be held stationary, depending on the properties of the individual parts or the control and the stresses to which the parts or control are subjected.

Thus, for instance, if the feeler rod 7 which is located farthest to the left in FIG. 3, and if the signal disc 5 is located in the position according to FIG. 3a, this feeler rod 7 will engage cam 5b, whereas the other three feeler rods 7 will not be contacted by either one of the two cams $5b_1$ and $5b_2$. Corresponding remarks apply to the other three feeler rods 7 of which the feeler rod 7 shown at the top in FIG. 3 will in the position of signal disc 5 be actuated according to FIG. 3b by the cam $5b_2$, whereas the feeler rod 7 located farthest toward the right in FIG. 3b will in the position of FIG. 3c be actuated by the cam 5b. Similarly, the feeler rod 7 shown at the bottom of FIG. 3 will in the position of the signal disc 5 of FIG. 3d be actuated by the cam $5b_2$.

FIG. 4 shows a longitudinal section through a first embodiment of a control device 6 according to the invention the side view of which will be evident from FIG. 1 while the design of the signal disc will be evident from FIGS. 2a-2d. The control device 6 has a housing 8 which comprises a front portion 8a, a partition 8b and a hood 8c. Each feeler rod 7 comprises a hollow bar 10 displaceably mounted in the housing 8. Displaceably mounted in the bore of the hollow rod 10 is a control rod 11 having its front end provided with a pivotal lever 12 pivotally supported by a pin 13. The rear end of said rod 11 cooperates with a signal emitter 9. A pressure medium operable piston 14 forms one piece with the hollow rod 10 and is reciprocable in a corresponding bore 8' of the front portion 8a of the housing while the rear side of the piston 14 is adapted to be acted upon by a pressure medium. The front side of the piston 14 is loaded by a return spring 15. FIG. 4 shows the two end positions of the feeler bar 7 and also shows how the left one of the feeler rods 7 cooperates with a groove in the signal disc 5 which prevents the signal disc 5 from abutting the lever 12 in advanced position.

In the embodiment illustrated in FIG. 4, the rear end of the hollow rod 10 if the control device 6 has screwed thereonto a valve housing 19 in which there is provided a ball 18 loaded by a spring 20. With this valve 16 forming a signal emitter generally designated 9, the bore of the hollow rod 10 serves as valve opening which is normally closed by the ball 18. Within the housing hood 8c of the control device 6, there is continuously maintained a certain pressure inasmuch as the pressure chamber 17 through a throttling passage 32 in the pressure feeding line 33 continuously communicates with a pressure producer or source of pressure fluid not shown. Connected to the pressure chamber 17 is a pressure monitor 34 which in response to a drop in the pressure immediately releases an impulse which can be converted to any desired control operation.

If in view of a faulty association between the advance feeler rod 7 and the respective position of the clamping jaws 3 indicated by the signal disc 5, the tiltable lever 12 on the advanced feeler rod 7 is actuated, the ball 18 is by means of the control rod 11 lifted off from the valve opening formed by the bore of the hollow rod 10. Inasmuch as this discharge cross section for the pressure medium in pressure chamber 17 is larger than the postflow cross section in the throttle passage 32, the pressure in the pressure chamber 17 drops so that an impulse is released by the pressure monitor 34.

Another embodiment of the valve 16 as signal emitter 9 in cooperation with the design of the lever 12 is illustrated in FIGS. 5 and 6. According to this embodiment, each hollow rod 10' has screwed thereonto a valve housing 19' which is adjustable and can be arrested in its adjusted condition by a counter nut 21. In the valve housing 19' there is likewise arranged a ball 18' the valve opening 16a of which, in contrast to the above-described embodiment, is illustrated by a bore in the valve housing 19'. The ball 18' is by the control rod 11' held in the closing position of valve 16' as will be evident from FIG. 5. When the tiltable lever 12' designed in conformity with FIG. 6 is engaged by the signal emitter 5 in the direction of the arrow and is pivoted, the control rod 11' releases the ball 18' so that, as described above, the pressure fluid from the pressure chamber 17 is adapted to flow through valve 16' through hollow rod 10' so that in view of the thus created underpressure in the pressure chamber 17 the pressure monitor 34 can produce an impulse.

While with the above-described embodiment of the control device 6 a pressure medium was made use of for advancing the feeler rods 7, and also the signal emitter 9 brought about an impulse produced by a pressure medium which impulse, however, was converted into an electric impulse by the pressure monitor 34, the second embodiment according to FIG. 7 illustrates a control device 6' of a purely electrical design.

Also with this embodiment, the control device 6' comprises a housing 8' which comprises a housing front portion 8a', a partition 8b' and a housing hood 8c'. The feeler rod 7'' again comprises a hollow rod 10'' with a pivotable lever 12'' which is journaled on a lever pin 13'' and the movement of which is by means of a control rod 11'' conveyed to the signal emitter 9. The advance of the respective feeler rod 7'' is with this embodiment effected by an electromagnet 22 which is connected to the partition 8b' and through the intervention of a pressure member 23 acts upon a slide 24. This slide 24 which carries the signal emitter 9 is guided on a guiding bolt 25 which latter is screwed into the housing front portion 8a' and is surrounded by a pressure spring 26 which brings about a return of the slide 24 when the electromagnet 22 is in its ineffective position. In order to fix the end position of the slide 24, an abutment pin 30 is connected to the partition 8b'.

In the illustrated embodiment of FIG. 7, the signal emitter 9 is formed by an electroswitch 27 which is connected to the slide 24. The control piece of the electroswitch 27 cooperates with a clamping member 28a which is connected to the control rod 11''. In view of a further clamping member 28b connected to the control rod 11'', a control spring 29 rests against the control rod 11''. The other end of the spring 29 rests against an extension of the slide 24.

When turning on the electromagnet 22 which moves the pressure member 23 downwardly, the slide 24 is against the thrust of pressure spring 26 moved downwardly on the guiding bolt 25 whereby simultaneously the hollow rod 10'' and the control rod 11'' and also the parts connected thereto are moved together with the slide 24. If in view of the signal disc 5, the lever 12'' is pivoted, the control spring 29 moves the control rod 11'' in the direction toward the lever 12'' whereby the clamping member 28a opens the electroswitch 27 which latter, as a result thereof, releases an impulse. In order to be able again to return the feeler rod 7'' to its original position, the rear end of the control rod 11'' extends from the housing hood 8c' and is provided with a handle 31. By means of this handle 31 it is possible after a tilting movement of the lever 12'' to pull back the control rod 11'' against the thrust of control spring 29 and to return the lever 12'' to its normal position in which it is held by the spring-loaded control rod 11'' until the next abutment with the signal disc 5 occurs.

It has already been mentioned that two fundamentally different possibilities exist for the employment of the control device of the invention. In the first instance, the feeler rod pertaining to the respective position of the clamping jaws is not actuated. Therefore, it merely acts as monitor and merely produces an impulse by means of the signal emitter only when the corresponding association is not in order. In the second instance, the circuit is so designed that with each proper association, an abutment of the signal disc against the pivotable lever of the respective feeler rod occurs. The postcontrol signal emitter may in this connection serve either as monitor or as impulse emitter for the further circuit control.

In both instances, the course of the control may be determined either by the position of the workpiece or by the program sequence of the tools. In the second instance, only one signal disc according to FIGS. 3a–3d can be employed. The feeler rods may, in this instance, as mentioned above either be stationary or displaceable. The feeler rods may be advanced individually as with the first embodiment or all feeler rods may be displaced together by a single pressure fluid piston or magnet.

It is, of course, to be understood that the present invention is, by no means, limited to the particular constructions shown in the drawings but also comprises any modifications within the scope of the appended claims.

I claim:

1. In combination: a workpiece-supporting chuck rotatable on a work axis and having workpiece-clamping jaws therein adjustable in the chuck in a direction transverse to the axis of rotation of the chuck, said jaws being rotatable about a second axis extending angularly to said work axis, a signal disc on the periphery of said chuck and protruding therefrom and connected to at least one clamping jaw to rotate therewith so as to indicate the rotated position of said jaws, a control device adjacent said chuck, feeler members movably carried by said control device in respective axial planes of said chuck and adapted for movement from retracted idle positions to advanced working positions, each feeler member in advanced working position having an end disposed within the radial limits of said disc and adjacent the path of movement taken by the disc as the chuck rotates, said control device comprising signalling means, and cooperating elements of signal-actuating means on said disc and the said one ends of said feeler members, the said element on each feeler member being adapted to cooperate with the corresponding said element on said disc only when the disc is in a respective rotated position and the pertaining feeler member is in advanced position.

2. The combination according to claim 1, in which the said elements on said disc are in the form of grooves in the disc facing said control device, each groove in the respective position of said disc extending in the circumferential direction of said chuck, each said groove being disposed in a respective one of said axial planes in a respective rotated position of said disc.

3. The combination according to claim 1, in which the said elements on said disc are in the form of cams protruding therefrom toward said control device, each cam being disposed in a respective one of said axial planes in a respective rotated position of said disc.

4. The combination according to claim 1, in which each feeler member is in the form of a hollow rod and is movable in said control device in an axial direction and generally radially of said chuck, a control rod extending along the axis of each hollow rod, the said element on each hollow rod comprising a lever pivoted to the said one end thereof and cooperating with the respective element on said disc to cause axial movement of the control rod in the hollow rod, and signal-emitting means on the other end of said hollow rod in said control device sensitive to said axial movement of said control rod.

5. The combination according to claim 4, which includes piston means formed on each hollow rod and a cylinder in said control device for each piston means.

6. The combination according to claim 4, in which said control device comprises a chamber into which said other end of each hollow rod is disposed, means for supplying pressure fluid to said chamber, and the said signal-emitting means on said other end of each hollow rod comprising a valve under the control of the respective control rod operable when actuated to cause a detectable change in pressure in said chamber.

7. The combination according to claim 6, in which said valve communicates with said chamber and comprises a housing having a port, a valve seat, and a valve member controlling said seat and adapted for actuation relative to said seat by movement of the control rod in the respective hollow rod.

8. The combination according to claim 7, in which said housing communicates with said chamber and has a port communicating with the interior of said hollow rod and having a seat, said valve member being spring biased toward said seat and being movable off said seat by said control rod upon actuation thereof by the respective lever.

9. The combination according to claim 7, in which said port communicates via said seat with the interior of said housing and said housing communicates with the atmosphere via said hollow rod, said valve member being held against said seat by said control rod and being released therefrom by movement thereof upon actuation of the respective lever.

10. The combination according to claim 4, in which said control device includes spring means urging each feeler member toward retracted position and an electromagnet for each feeler member energizable for moving the respective feeler member to advanced position.

11. The combination according to claim 1, in which said signalling means comprises a switch for each feeler member adapted for actuation by the respective signal-actuating means.

* * * * *